United States Patent
Vergnaud (10) Patent No.: US 6,603,220 B2
(45) Date of Patent: Aug. 5, 2003

(54) TERMINAL ADAPTED TO BE POWERED LOCALLY AND TO RECEIVE A REMOTE POWER FEED VIA A LINK CONNECTING IT TO A LOCAL AREA NETWORK

(75) Inventor: Gérard Vergnaud, Franconville (FR)

(73) Assignee: Alcatel, Paris (FR)

(*) Notice: Subject to any disclaimer, the term of this patent is extended or adjusted under 35 U.S.C. 154(b) by 132 days.

(21) Appl. No.: 09/963,516

(22) Filed: Sep. 27, 2001

(65) Prior Publication Data
US 2002/0042229 A1 Apr. 11, 2002

(30) Foreign Application Priority Data
Oct. 5, 2000 (FR) .............................. 00 12725

(51) Int. Cl.[7] .................................. H02J 7/00
(52) U.S. Cl. ........................................ 307/64; 370/908
(58) Field of Search .................... 370/245, 252, 370/908, 899, 401; 361/66; 713/300, 310, 340; 702/57; 307/64

(56) References Cited

U.S. PATENT DOCUMENTS 6,005,759 A * 12/1999 Hart et al. ................... 361/66
6,218,930 B1 * 4/2001 Katzenberg et al. ... 340/310.01

FOREIGN PATENT DOCUMENTS

EP          0 981 227 A2  *  2/2000
WO          WO 96/26377   *  8/1996

OTHER PUBLICATIONS

Patent Abstracts of Japan, vol. 1999, No. 14, Dec. 22, 1999 & JP 11 252148 A (Oki Electric Ind Co Ltd), Sep. 17, 1999.*

* cited by examiner

Primary Examiner—Shawn Riley
(74) Attorney, Agent, or Firm—Sughrue Mion, PLLC (57) ABSTRACT

A terminal includes a local power supply, which can be backed up by a remote power feed, and an identification module connected to at least two conductors of a link. The module enables remote detection that the terminal can receive a remote power feed. The terminal further includes a circuit for drawing a predetermined remote power feed current and which is activated when the local power supply is working normally and disabled if the local power supply is not working normally and if the remote power feed is not applied to the link. Applications include telephone terminals using the Internet protocol.

4 Claims, 5 Drawing Sheets

FIG_1

FIG_2

FIG_3

FIG_4

FIG_5

FIG_6

FIG_7

TERMINAL ADAPTED TO BE POWERED LOCALLY AND TO RECEIVE A REMOTE POWER FEED VIA A LINK CONNECTING IT TO A LOCAL AREA NETWORK

CROSS-REFERENCE TO RELATED APPLICATIONS

This application is based on French Patent Application No. 00 12 725 filed Oct. 5, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a terminal adapted to be powered locally and to receive a remote power feed via a link connecting it to a computer local area network, for example an Ethernet network.

2. Description of the Prior Art

Terminals connected to a computer local area network (for example personal computers, printers, etc.) are conventionally powered locally, from the mains power supply. 110 V or 220 V power cords independent of the data connections therefore power the terminals. This solution increases the difficulty of installing the local area network:

The use of two cords gives rise to problems of overall size that can additionally restrict the movement of persons.

It creates electrical hazards.

A telephone powered locally by the mains power supply also has the disadvantage of being out of service in the event of a mains power outage, in particular in the case of fire or natural disaster. This is why conventional telephones receive a remote power feed from their local exchange, which includes back-up batteries.

Telephone terminals connected to a computer local area network are coming into use. It is therefore desirable for some terminals connected to a computer local area network to receive a remote power feed over the same link as that used to send/receive data. One way to transmit a remote power feed current is to use two of the eight wires of the link: four other wires of the eight constitute two pairs of wires respectively used to transmit and receive data. Another method, known as a phantom circuit, connects the two terminals of a power supply generator in the remote power feed device to respective center-taps of a transformer winding connected to the pair for receiving data and a winding of another transformer connected to the pair for sending data. At the terminal end, the power supply voltage is supplied by respective center-taps of a transformer winding connected to the pair for receiving data and a winding of another transformer connected to the pair for sending data.

In both cases, providing a remote power feed to a terminal via the computer local area network has the disadvantage that the remote power feed device powers a terminal blind. The RJ45 connector at the end of the link may be connected to a terminal of a type other than a telephone (for example a personal computer, a printer, etc.). There is a risk of damaging the electrical circuits of the terminal. The RJ45 connector of a terminal is generally used in the following manner:

Four of the eight wires are separated into two pairs for respectively transmitting and receiving data. The terminal includes a transformer having a winding connected to the receive pair and a transformer having a winding connected to the send pair, each of these windings having a center-tap that can be connected to a reference potential via a resistor of low resistance.

Four other wires, not used, are grounded, often via a combination of resistors and capacitors, to eliminate any crosstalk currents induced by data signals in the first four wires and to reduce undesirable electromagnetic emission. If a relatively high power supply voltage, for example 48 volts, is applied to this combination of resistors and capacitors, or to the resistors connected to the center-taps of the transformers, the current flowing in the resistors can destroy them.

Methods are currently under investigation for providing a remote power feed to a terminal in a computer local area network preventing all risk of damage if a terminal that is not adapted to receive a remote power feed via the network is connected to the network.

This kind of method consists of:

producing a test signal, or a plurality of test signals, on at least two conductors of a link for connecting the local area network to a remote terminal, the energy of the signal(s) being such that the terminal cannot be damaged under any circumstances;

detecting the presence of a remote terminal adapted to receive a remote power feed by detecting the presence of identification modules shunting the link in the remote terminal, on the basis of the current produced by the test signal(s) in the link; and sending a remote power feed current over the link if and only if the presence of a terminal adapted to receive a remote power feed has been detected.

This kind of method prevents all risk to the terminals because the remote power feed current is sent only after identifying the terminal as one adapted to receive a remote power feed. The current and the duration of the test signal or signals are chosen so that the operation of detecting the presence of a terminal adapted to receive a remote power feed before providing the remote power feed cannot cause any damage if the terminal is not a terminal adapted to receive a remote power feed.

Also, the remote power feed must be interrupted as soon as the terminal is disconnected from the link, because another could be connected at any time. There is therefore provision for continuously detecting the presence of a terminal during remote power feeding, by measuring the remote power feed current. The remote power feed device concludes that there has been a disconnection when it detects that the current drawn is less than a predetermined threshold value during a time interval having a predetermined duration sufficient for it to be sure that there has really been a disconnection.

The following are used in the same computer local area network: terminals powered only locally, terminals powered only by a remote power feed, and terminals powered locally in normal operation but adapted to receive a remote power feed in the event of failure of the local power supply, at least to maintain basic functions.

This latter type of terminal is provided with an identification module similar to that of a terminal that must receive a remote power feed at all times, but obviously does not draw any remote power feed current since it is powered locally. For the remote power feed device, the absence of a remote power feed current would make it resemble a disconnected terminal. This absence of a remote power feed current would lead the remote power feed device to suspend the remote power feed over the link. The local power supply would therefore have no back-up. One feasible solution to this problem would be to provide in the terminal a resistor shunting the two remote power feed poles and having a resistance such that the current drawn continuously from the remote power feed would be above the threshold value. However, this solution would have two drawbacks:

- A non-negligible reduction in the maximum power that the remote power feed could provide to this kind of terminal when backing up the local power supply: if the threshold value is 20 mA and if the nominal voltage of the remote power feed is 48 volts, for example, the power dissipated unnecessarily is approximately 1 W per terminal. If the maximum power that can be delivered via the link is 14 W, for example, the maximum power effectively available for the remote power feed to the terminal is only 13 W, which reduces the capabilities of the terminal.
- Greater difficulty in implementing the identification module of the terminal adapted to receive a remote power feed, since the additional resistor shunts the identification module, in particular during the tests to identify the type of terminal. It therefore modifies the apparent electrical characteristics of the module. Producing an identification module operating satisfactorily is therefore more complicated.

A first object of the invention is to enable better use of the power that the remote power feed can supply when it is backing up the local power supply of a terminal.

SUMMARY OF THE INVENTION

The invention provides a terminal adapted to be powered locally and to receive a remote power feed via a link connecting it to a local area network, the terminal including a local power supply and an identification module connected to at least two conductors of the link, the identification module enabling remote detection that the terminal is adapted to receive a remote power supply, which terminal further includes:

means for drawing a predetermined remote power feed current, and control means including means for activating the current-drawing means when the local power supply is working normally and for inhibiting the current-drawing means when the local power supply is not working normally.

When the local power supply cannot power it, the above terminal has available to it all of the maximum power that the remote power feed can supply, because the control means inhibit the means for drawing a predetermined remote power feed current until they register the fact that the local power supply is again able to power the terminal.

When the local power supply is again able to power it, the above terminal again draws a predetermined remote power feed current chosen to be sufficient for the terminal to be detected by the remote power feed device as being still connected.

In a preferred embodiment, the control means further include means for inhibiting the current-drawing means when the remote power feed is not applied to the link. Thus the current-drawing means do not affect the operation of the identification module during the process of detecting that the terminal is adapted to receive a remote power feed, which precedes the application of the remote power feed.

The invention will be better understood and other features of the invention will become apparent in the course of the following description and from the accompanying drawings.

DETAILED DESCRIPTION OF THE PREFERRED EMBODIMENTS

Figure 1:
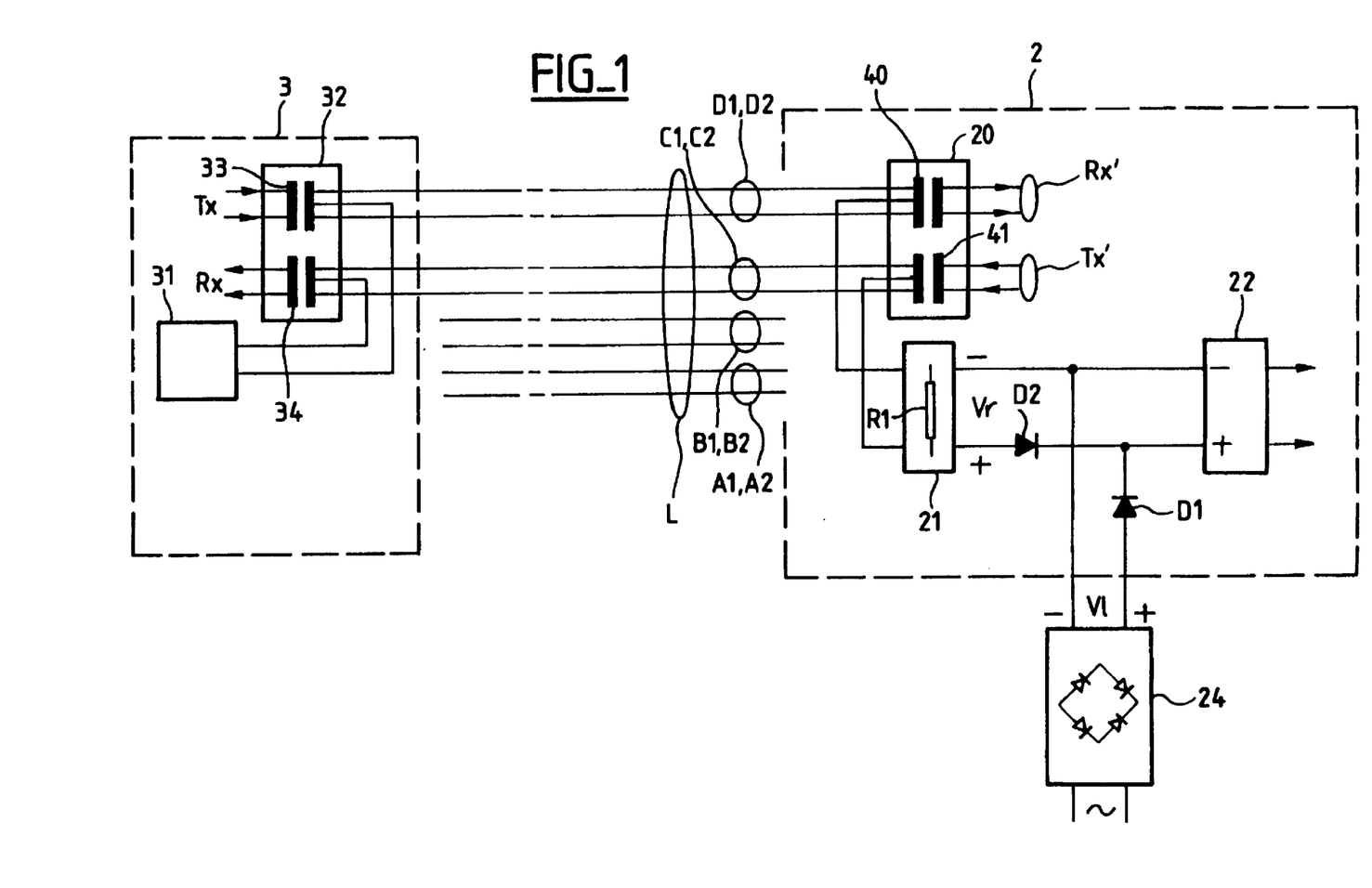
FIG. 1 is a block diagram of part of one example of a local area network including at least one prior art terminal adapted to be powered locally and to receive a remote power feed via its connection to the local area network.

FIG. 1 is a block diagram of one embodiment of a remote power feed device in a repeater 3 and one embodiment of a prior art terminal 2 that is powered locally and backed up by a remote power feed via a common mode phantom circuit using the two data send/receive pairs. The link L includes four pairs:

A1, A2 not used,

B1, B2 not used,

C1, C2 used to transmit data to the network, in differential mode, and

D1, D2 used to transmit data to the terminal, in differential mode.

The pairs C1, C2 and D1, D2 are also used in common mode to provide a remote power feed to the terminal 2 via a phantom circuit.

The repeater 3 includes a remote power feed unit 31 adapted to detect the presence of a terminal adapted to receive a remote power feed and a combiner 32. The combiner 32 includes two transformers 33 and 34 respectively transmitting a signal Tx to be sent to a terminal and a signal Rx received from a terminal. Each has a first winding and a second winding. The first windings are respectively connected to the pairs D1, D2 and C1, C2. Each has a respective center-tap connected to an output of the remote power feed unit 31 adapted to detect the presence of a terminal adapted to receive a remote power feed. The second windings are connected to other units of the repeater 3, not shown.

The terminal 2 includes a splitter 20 and a voltage-reducing DC—DC converter 22. The splitter 20 includes two transformers 41 and 40, respectively for transmitting a signal Tx' to be sent to the repeater 3 and for transmitting a signal Rx' received by the terminal 2. Each includes a first winding and a second winding. The first windings are respectively connected to the pairs D1, D2 and C1, C2. Each has a center-tap. Those center-taps provide a DC remote power feed voltage Vr. In this example, the center-tap of the first winding of the transformer 41 constitutes the positive pole of the remote power feed. It is connected via a diode D2 to a positive input of the converter 22. The center-tap of the second winding of the transformer 40 constitutes the negative pole of the remote power feed. It is connected directly to a negative input of the converter 22.

A prior art identification module 21 shunts the two poles of the remote power feed. It enables the unit 31 to detect that the terminal is adapted to receive a remote power feed. The electrical characteristics of the identification module 21 are chosen so that it does not short circuit the remote power feed voltage supplied to the converter 22 and is easily distinguishable from terminations routinely connected to the available conductors of the RJ45 connectors of the terminals. In the module 21, a resistor R1 is connected between the two poles of the remote power feed and draws a current equal to or greater than the threshold value (20 mA in this example). The resistor R1 enables the remote power device 3 to detect a remote power feed current in order to detect disconnection of the terminal 2. However, it affects the electrical characteristics of the identification module 21 and therefore makes producing that module more complicated.

The local power supply is a conventional mains power supply 24 providing a nominal DC voltage of 50 volts, for example; the nominal remote power feed voltage is 48 volts. The positive pole of the mains power supply 24 is connected to the positive input of the converter 22 via a diode D1. The anode of the diode D1 is connected to the positive input. The negative pole of the mains power supply 24 is connected directly to the negative input of the converter 22. In normal operation the diode D1 conducts and the diode D2 does not conduct, because of the difference between the two supply voltages. There would therefore be no remote power feed current if it were not for the resistor R1 in the module 21.

In the event of a mains power outage, the voltage supplied by the mains power supply 24 disappears, the diode D2 begins to conduct, and the diode D1 ceases to conduct. The converter 22 can therefore continue to operate thanks to the remote power feed. The resistor R1 continues to draw the same remote power feed current.

It is feasible to reserve the remote power feed current to essential functions of the terminal during mains power outages and not to supply the remote power feed current to other non-essential functions that consume large amounts of energy.

In a different embodiment, instead of providing a remote power feed via a phantom circuit, and depending on the power the terminal needs, a remote power feed can be provided via:

the conductors A1, A2 only; or

B1, B2 only; or

A1, A2, B1 and B2 simultaneously; or

A1, A2, B1, B2 and the phantom circuit simultaneously.

Figure 2:
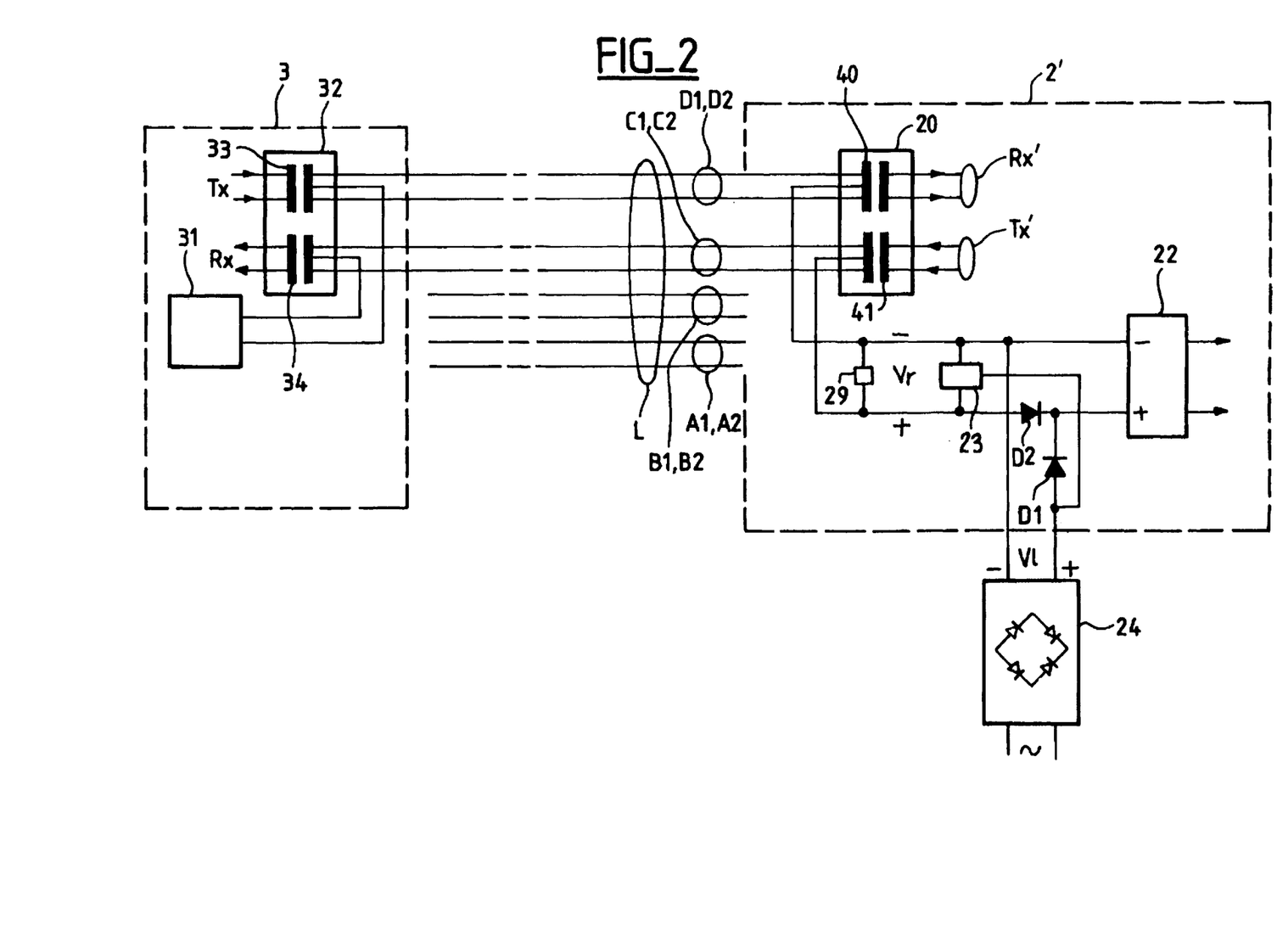
FIG. 2 is a block diagram of part of one example of a local area network including a first embodiment of a terminal according to the invention.

FIG. 2 is a block diagram of one embodiment of a terminal 2 in accordance with the present invention receiving a remote power feed via a common mode phantom circuit using the two data send/receive pairs. Components analogous to those of FIG. 1 carry the same reference number. In particular, the remote power device 3 is unchanged. The terminal 2' differs from the terminal 2 in that it includes an identification module 29 that draws practically no remote power feed current and further includes a circuit 23 for drawing a predetermined remote power feed current (at least 20 mA in this example) which is activated when the local power supply 24 is working and disabled when the local power supply 24 is not working and if the remote power feed is not applied.

Figure 3:
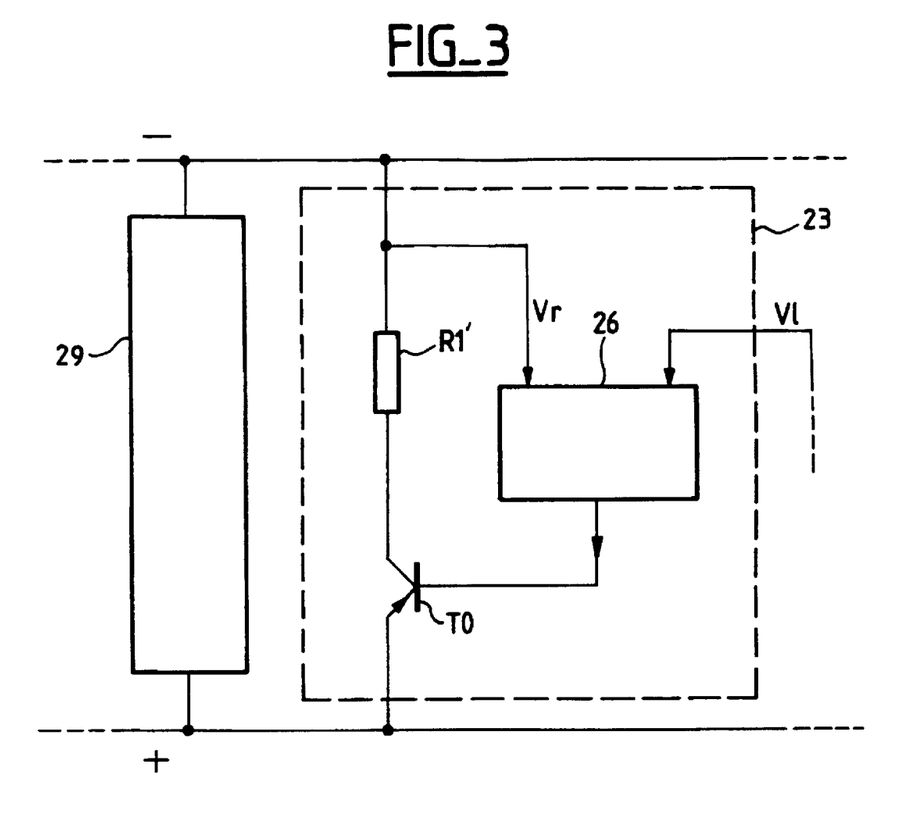
FIG. 3 is a block diagram of part of this first embodiment of a terminal according to the invention.

FIG. 3 is a block diagram of the circuit 23. In this embodiment, it includes:

Three terminals, a first terminal and a second terminal being respectively connected to the negative pole and to the positive pole of the remote power feed and the third terminal being connected to the positive pole of the mains power supply 24.

A resistor R1' whose first terminal is connected to the negative terminal of the circuit 23.

A PNP bipolar transistor T0 used as a switch, its emitter being connected to the positive terminal of the circuit 23 and its collector being connected to the second terminal of the resistor R1'.

A control circuit 26 having an input connected to the negative terminal of the circuit 23, an input connected to the third terminal of the circuit 23, and an output applying a binary signal to the base of the transistor T0.

The control circuit 26 compares the remote power feed voltage Vr to a threshold value equal to 30 volts, for example, to detect that the remote power feed is applied, and compares the remote power feed voltage Vr to the voltage Vl of the local power supply 24. If the remote power feed is not applied, not only would connecting an additional resistor R1' shunting the two poles of the remote power feed be of no utility, but it would also affect the implementation of the identification module 29. In this case, the circuit 26 turns off the transistor TO. The remote power feed device 31 then sees only the identification module 29.

If the remote power feed is applied, and if the local power supply 24 is working normally, the remote power feed voltage Vr being lower than the voltage Vl of the local power supply 24, the control circuit 26 saturates the transistor T0. The resistor R1' is then connected between the two poles of the remote power feed. The current drawn from the remote power feed is fixed by the resistor R1' only, because the diode D2 is not conducting. The resistance of the resistor R1' is chosen so that the current is at least equal to the threshold value, 20 mA in this example.

If the remote power feed is applied and if the local power supply 24 is no longer working (because of a mains power outage, for example), the control circuit 26 turns off the transistor TO. The current drawn from the remote power feed is that drawn by the converter 22 (the current drawn by the identification module 21 is negligible).

In other embodiments, described below, the identification module 21 and the circuit 23 are combined in a single circuit.

Figure 4:
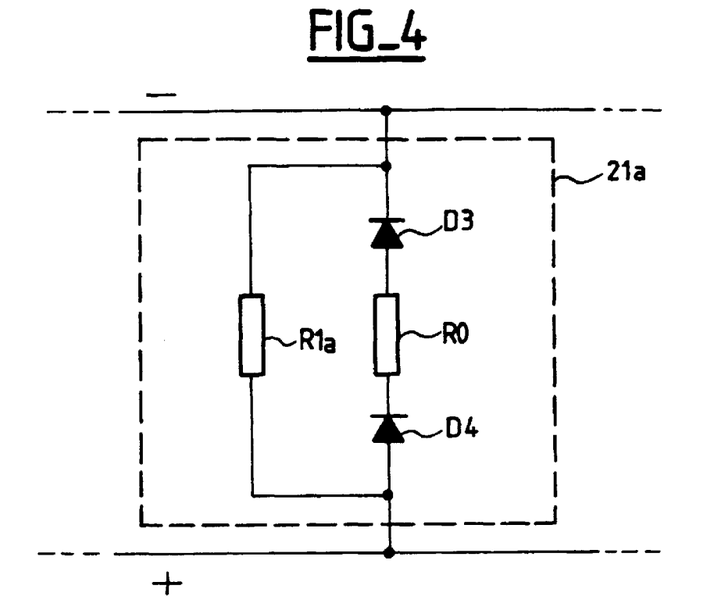
FIG. 4 is a more detailed block diagram of a first embodiment of a prior art identification module.

FIG. 4 is a more detailed block diagram of an identification module 21a constituting a first embodiment of a prior art identification module 21. It includes, in series between the negative terminal and the positive terminal of the module, a diode D3, a resistor R0 of 25 kilohms, and a diode D4, the resistor R1a being inserted between the diodes D3 and D4. The cathode of the diode D3 is connected to the negative terminal of the module. The anode of the diode D4 is connected to the positive terminal. The resistance of the resistor R0 is chosen so that it is possible to detect the presence of a terminal adapted to receive a remote power feed before applying the remote power feed voltage.

Both diodes conduct when the remote power feed is applied, but the current drawn is very much lower than the threshold current for detecting the presence of a terminal adapted to receive a remote power feed. This is why a resistor R1a shunts the positive and negative poles of the remote power feed. Its resistance is chosen so that the current drawn is at least equal to 20 mA when the remote power feed is applied in order to be able to detect disconnection after application of the remote power feed.

Figure 5:
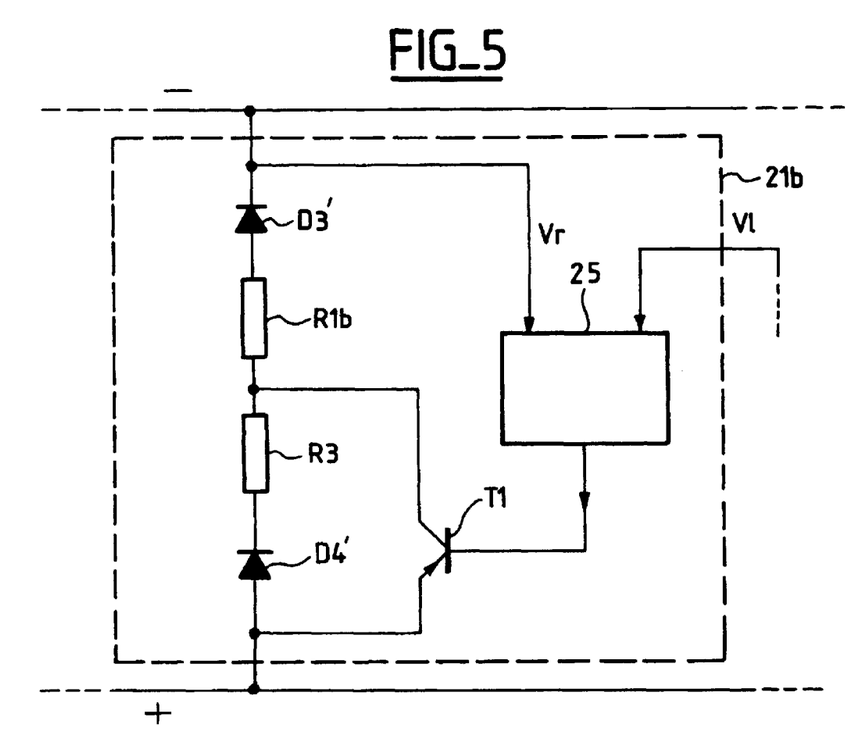
FIG. 5 is a block diagram of part of a second embodiment of a terminal according to the invention.

FIG. 5 is a block diagram of a circuit 21b constituting a first embodiment of a circuit combining the functions of the module 21a and the functions of the circuit 23. It includes:

Three terminals, a first terminal and a second terminal being respectively connected to the negative pole and to the positive pole of the remote power feed and the third terminal being connected to the positive pole of the mains power supply 24.

In series between the negative terminal and the positive terminal of the module 21b, a diode D3', a resistor R1b, a resistor R3, and a diode D4', the resistors R1*b* and R3 being inserted between the diodes D3' and D4'.

A PNP bipolar transistor T1 used as a switch, its emitter being connected to the positive terminal of the module 21*b* and its collector being connected to a point common to the resistors R1*b* and R3.

An analog control circuit 25 having an input connected to the positive terminal of the module 21*b*, an input connected to the third terminal of the module 21*b*, and an output applying a binary control signal to the base of the transistor T1.

R1*b*+R3=R0=25 kilohms in this example.

The control circuit 25 compares the remote power feed voltage Vr to a threshold value equal to 30 volts, for example, to detect if the remote power feed is applied, and compares the remote power feed voltage Vr to the voltage Vl of the local power supply 24. If the remote power feed is not applied, not only would reducing the resistance shunting the two poles of the power supply be of no utility, but it would also affect the implementation of the identification module 21*b*. In this case, the circuit 25 turns off the transistor T1. The circuit 21*b* then behaves exactly like the prior art identification module 21*a* during the process of identifying the terminal.

If the remote power feed is applied and if the local power supply 24 is working normally, the remote power feed voltage Vr being less than the voltage Vl of the local power supply 24, the control circuit 25 saturates the transistor T1. The transistor Ti then practically short circuits the diode D4' and the resistor R3. The current drawn is fixed by the resistor R1*b* at a value higher than the threshold value (the resistance of the resistor R1*b* is chosen so that the remote power feed current is at least 20 mA in this example).

When the local power supply 24 is no longer working (because of a mains power outage, for example), the control circuit 25 turns off the transistor T1. The remote power feed current drawn is equal to the current drawn by the converter 22 plus that fixed by the sum of the resistances of the resistors R1*b* and R3, which is negligible (approximately 2 mA).

Figure 6:
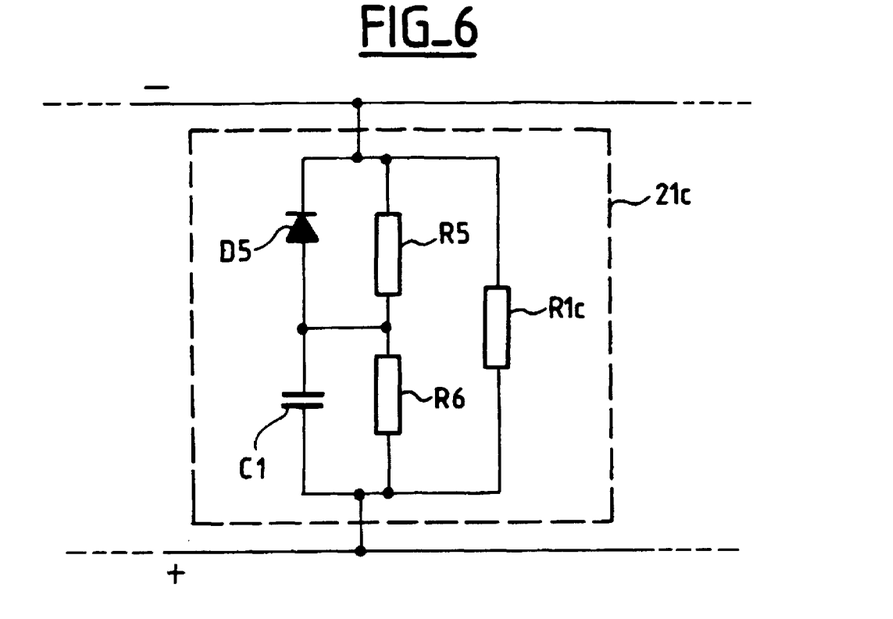
FIG. 6 is a more detailed block diagram of a second embodiment of a prior art identification module.

FIG. 6 is a detailed block diagram of an identification module 21*c* constituting a second embodiment of a prior art identification module 21. It includes, in series between the negative terminal and the positive terminal of the module, a diode D5 in parallel with a resistor R5 (of 2 kilohms), on the one hand, and a capacitor C1 (of 0.3 to 1 microfarad) in parallel with a resistor R6 (of 100 kilohms), on the other hand. The cathode of the diode D5 is connected to the negative terminal of the module and one terminal of the capacitor C1 and one terminal of the resistor R6 are connected to the positive terminal. The values of these components are chosen so that the presence of a terminal adapted to receive a remote power feed can be detected by direct current and alternating current tests before applying the remote power feed voltage.

The diode D5 conducts when the remote power feed is applied and the current drawn is therefore determined by the resistance of the resistor R6 as long as the diode D2 is not conducting. However, the current drawn is very much lower than the threshold current (20 mA), which enables the presence of a terminal adapted to receive a remote power feed to be detected during remote power feeding. This is why a resistor R1*c* shunting the positive and negative poles of the remote power feed is also provided. Its resistance is chosen so that the total current drawn is at least equal to 20 mA when the remote power feed is applied, in order to be able to detect disconnection after application of the remote power feed.

Figure 7:
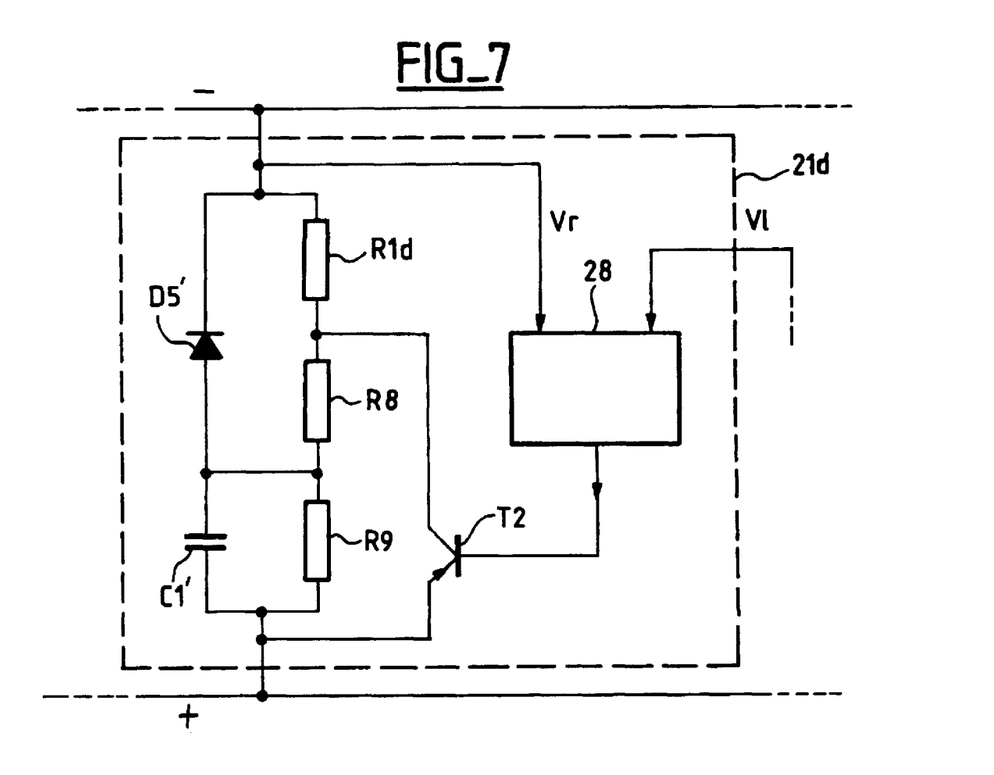
FIG. 7 is a block diagram of part of a third embodiment of a terminal according to the invention.

FIG. 7 is a detailed block diagram of a circuit 21*d* constituting one embodiment of a circuit combining the functions of the module 21*c* and the functions of the circuit 23. It includes:

Three terminals, a first terminal and a second terminal being respectively connected to the negative pole and to the positive pole of the remote power feed, and the third terminal being connected to the positive pole of the mains power supply 24.

In series between the negative terminal and the positive terminal of the module 21*d*, a diode D5' in parallel with a resistor R1*d* and a resistor R8 in series, on the one hand, and a capacitor C1' (analogous to the capacitor C1) in parallel with a resistor R9 (of 100 kilohms), on the other hand.

A PNP bipolar transistor T2 used as a switch, its emitter being connected to the positive terminal of the module 21*d* and its collector being connected to a point common to the resistors R1*d* and R8.

An analog control circuit 28 having an input connected to the positive terminal of the module 21*d*, an input connected to the third terminal of the module 21*d*, and an output applying a binary signal to the base of the transistor T2.

R1*d*+R8=R5=2 kilohms in this example.

The control circuit 28 compares the remote power feed voltage Vr to a threshold value equal to 30 volts, for example, to detect that the remote power feed is applied, and compares the remote power feed voltage Vr to the voltage Vl of the local power supply 24. If the remote power feed is not applied, not only would reducing the resistance shunting the two poles of the remote power feed be of no utility, but it would also affect the implementation of the identification module 21*d*. In this case, the circuit 28 turns off the transistor T2. The circuit 21*d* then behaves exactly like the prior art identification module 21*c* during the process of identifying the terminal.

If the remote power feed is applied and if the local power supply 24 is working normally, the remote power feed voltage Vr being lower than the voltage Vl of the local power supply 24, the control circuit 28 saturates the transistor T2. The transistor T2 than practically short circuits the resistor R8 and the resistor R9. The current drawn is fixed by the resistor R1*d* at a value higher than the threshold value (the resistance of the resistor R1*d* is chosen so that the remote power feed current is at least equal to 20 mA in this example).

When the local power supply 24 is no longer working (because of a mains power outage, for example), the control circuit 28 turns off the transistor T2. The remote power feed current drawn is equal to that drawn by the converter 22 plus that fixed by the sum of the resistances of the resistors R1*d*, R8, R9, which is negligible (approximately 0.5 mA).

What is claimed is:

1. A terminal adapted to be powered locally and to receive a remote power feed via a link connecting it to a local area network, said terminal including a local power supply and an identification module connected to at least two conductors of said link, said identification module enabling remote detection that said terminal is adapted to receive a remote power supply, which terminal further includes:

means for drawing a predetermined remote power feed current, and control means including means for activating the current-drawing means when said local power supply is working normally and for inhibiting said current-drawing means when said local power supply is not working normally.

2. The terminal claimed in claim 1 wherein said control means further include means for inhibiting said current-drawing means when said remote power feed is not applied to said link.

3. The terminal claimed in claim 1 wherein said means for drawing a remote power feed current include a resistor shunting said remote power feed via a switch controlled by said control means.

4. The terminal claimed in claim 1 wherein said means for drawing a remote power feed current include a resistor shunting said remote power feed via a switch controlled by said control means and said resistor is part of an identification module enabling remote detection of the presence of a terminal adapted to receive a remote power feed.

* * * * *